US012631229B2

(12) United States Patent
Knop et al.

(10) Patent No.: US 12,631,229 B2
(45) Date of Patent: May 19, 2026

(54) ACTUATOR ASSEMBLY FOR A VEHICLE BRAKE

(71) Applicant: ZF Active Safety GmbH, Koblenz (DE)

(72) Inventors: Volker Knop, Ulmen (DE); Nicholas Alford, Waldesch (DE); Werner Seibert, Kammerforst (DE); Christoph Beuerle, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 590 days.

(21) Appl. No.: 17/987,330

(22) Filed: Nov. 15, 2022

(65) Prior Publication Data

US 2023/0151862 A1 May 18, 2023

(30) Foreign Application Priority Data

Nov. 17, 2021 (DE) .......................... 102021129964.0

(51) Int. Cl.
    *F16D 65/18* (2006.01)
    *F16D 65/00* (2006.01)
    *F16D 121/24* (2012.01)
(52) U.S. Cl.
    CPC ......... F16D 65/18 (2013.01); F16D 65/0068 (2013.01); *F16D 2121/24* (2013.01)
(58) Field of Classification Search
    CPC ... F16D 65/18; F16D 65/0068; F16D 2121/24
    USPC ............................... 188/72.1, 72.7, 154–162
    See application file for complete search history.

(56) References Cited

U.S. PATENT DOCUMENTS

| | | | | |
|---|---|---|---|---|
| 7,273,134 B2* | 9/2007 | Schack | ................. | F16D 65/183 |
| | | | | 188/1.11 R |
| 7,823,983 B2* | 11/2010 | Inagaki | ................... | F16D 65/18 |
| | | | | 303/89 |
| 2003/0042084 A1* | 3/2003 | Kawase | ................... | F16D 55/00 |
| | | | | 188/72.1 |
| 2007/0209888 A1* | 9/2007 | Adachi | ................... | F16D 65/18 |
| | | | | 188/162 |
| 2013/0327606 A1* | 12/2013 | Platzer | ................ | F16D 65/0006 |
| | | | | 188/368 |
| 2018/0023681 A1 | 1/2018 | Aida | | |
| 2023/0150472 A1* | 5/2023 | Knop | ....................... | F16D 65/18 |
| | | | | 188/72.8 |
| 2023/0151879 A1* | 5/2023 | Knop | .................. | F16H 25/2223 |
| | | | | 188/156 |

(Continued)

FOREIGN PATENT DOCUMENTS

| | | |
|---|---|---|
| DE | 69922421 T2 | 5/2005 |
| DE | 102009038138 A1 | 12/2010 |

(Continued)

*Primary Examiner* — Christopher P Schwartz
(74) *Attorney, Agent, or Firm* — Kristin L. Murphy

(57) ABSTRACT

An actuator assembly for a vehicle brake is described, with a brake calliper in which a space is formed for a brake disc, and an actuating slide for a brake pad. The actuating slide can be moved optionally between a retracted position and an extended position. In the brake calliper, adjoining the space, a sleeve-like portion is formed with a running face for the actuating slide. The actuating slide is received in the sleeve-like portion and is guided linearly on the running face.

13 Claims, 2 Drawing Sheets

(56)         References Cited

U.S. PATENT DOCUMENTS

2024/0209909  A1 *   6/2024   Knop ...................... F16D 65/46
2024/0209928  A1 *   6/2024   Knop ................. F16H 25/2228

FOREIGN PATENT DOCUMENTS

DE       102011005517  A1 *   9/2012   ............. F16D 65/14
DE       102017003158  A1 *  10/2017   ............. F16D 65/18

* cited by examiner

ACTUATOR ASSEMBLY FOR A VEHICLE BRAKE

CROSS-REFERENCE TO RELATED APPLICATION

This application claims priority to German Priority Application No. 102021129964.0, filed Nov. 17, 2021, the disclosure of which is incorporated herein by reference in its entirety.

TECHNICAL FIELD

The disclosure concerns an actuator assembly for a vehicle brake, with a brake calliper and an actuating slide for a brake pad which is guided linearly in the brake calliper.

The actuating slide can be moved optionally between a retracted position and an extended position, and serves to move a brake pad. In one exemplary arrangement, the brake pad may be applied to a brake disc by the actuating slide.

BACKGROUND

Usually, a guide sleeve is provided for linear guidance of an actuating slide, wherein the actuating slide is received and guided linearly in said guide. The use of a guide sleeve however leads to increased cost in production of the actuator assembly.

What is therefore needed is simple and economic arrangement of a stable guidance of the actuating slide.

SUMMARY

An actuator assembly for a vehicle brake is disclosed, with a brake calliper in which a space is formed for a brake disc, and an actuating slide for a brake pad, wherein the actuating slide can be moved optionally between a retracted position and an extended position. In the brake calliper, adjoining the space, a sleeve-like portion is formed with a running face for the actuating slide, wherein the actuating slide is received in the sleeve-like portion and is guided linearly on the running face.

According to the disclosure, the sleeve-like portion is formed integrally in the brake calliper.

Because the running face for the actuating slide is formed in the brake calliper, this achieves an advantage that no separate guide sleeve is required. This arrangement reduces the number of components, thereby reducing both production costs and also installation complexity.

The brake calliper is usually a casting and thus has the necessary stability to guarantee a stable guidance of the actuating slide.

In one exemplary arrangement, the running face of the brake calliper is machined to ensure that the actuating slide can slide as smoothly as possible.

According to one exemplary arrangement, the actuator assembly comprises an electric motor which is coupled for drive purposes to the actuating slide via a gear unit and a spindle drive, in order to move the actuating slide between the retracted position and the extended position. In one exemplary arrangement, the actuator assembly is accordingly an electromechanical actuator assembly. An electric motor may generate a sufficiently high force to apply a brake pad to a brake disc by the actuating slide.

In one exemplary arrangement, the sleeve-like portion is open towards the space. The actuating slide can accordingly be moved into the space, in order to move the brake pad which is arranged in the space.

In one exemplary arrangement, an opening is present in the brake caliper in the region of the sleeve-like portion, and a rotational locking element protrudes through the opening. The rotational locking element engages in an axially running groove on the actuating slide. The groove runs in a displacement direction of the actuating slide. The rotational locking element allows the actuating slide to be easily mounted in the sleeve-like portion in a rotationally fixed fashion.

For example, in one exemplary arrangement, the rotational locking element is a screw, a bolt or similar. Such elements are cheap and easily available.

In one exemplary arrangement, the opening can be created easily by a bore from an outside of the brake calliper into the interior of the sleeve-like portion.

In one exemplary arrangement, on an end facing away from the space, the sleeve-like portion has a wall which runs transversely to a movement direction of the actuating slide, wherein the spindle drive rests axially on the wall. In this way, an axial force, which builds up during application of the brake pad on the brake disc, is transmitted to the wall via the actuating slide and the spindle drive. In other words, the wall forms an abutment for the actuating slide during application of the brake pad on the brake disc. Because the abutment is integrated in the brake calliper, a compact construction of the actuator assembly is achieved.

The support on the wall may take place either directly or indirectly via an additional bearing. Support via an additional bearing has the advantage of reducing a friction during rotation of the spindle drive.

In one exemplary arrangement, an opening is present in the wall, wherein a shaft of the spindle drive extends through the opening and the shaft is coupled to the gear unit outside the sleeve-like portion. The opening accordingly guarantees the accessibility of the spindle drive for drive purposes.

According to one exemplary arrangement, a rotational locking geometry is formed on an outer wall of the brake calliper in the region of the sleeve-like portion for form-fit connection of the brake calliper to a frame part of a carrier assembly. Such a rotational locking geometry allows a stiff connection between the frame part and the brake calliper, so that a reliable force transmission to the actuating slide is guaranteed.

For example, fixing interfaces for the electric motor and a receiving space for the gear unit are formed on the frame part.

In one exemplary arrangement, the rotational locking geometry is a splined shaft geometry. The brake calliper and the frame part can easily be joined together by an axial push-fit movement.

A recess for a seal may be provided on an inside of the brake calliper at the transition from the space to the sleeve-like portion. If a seal is inserted in the recess, the gear unit and the spindle drive are sealed against the space, preventing dirt particles or abrasion from the brake pads from entering the gear unit.

BRIEF DESCRIPTION OF DRAWINGS

Further advantages and features of the disclosure will become apparent from the following description and from the accompanying drawings, to which reference is made. In the drawings.

DETAILED DESCRIPTION

Figure 1:
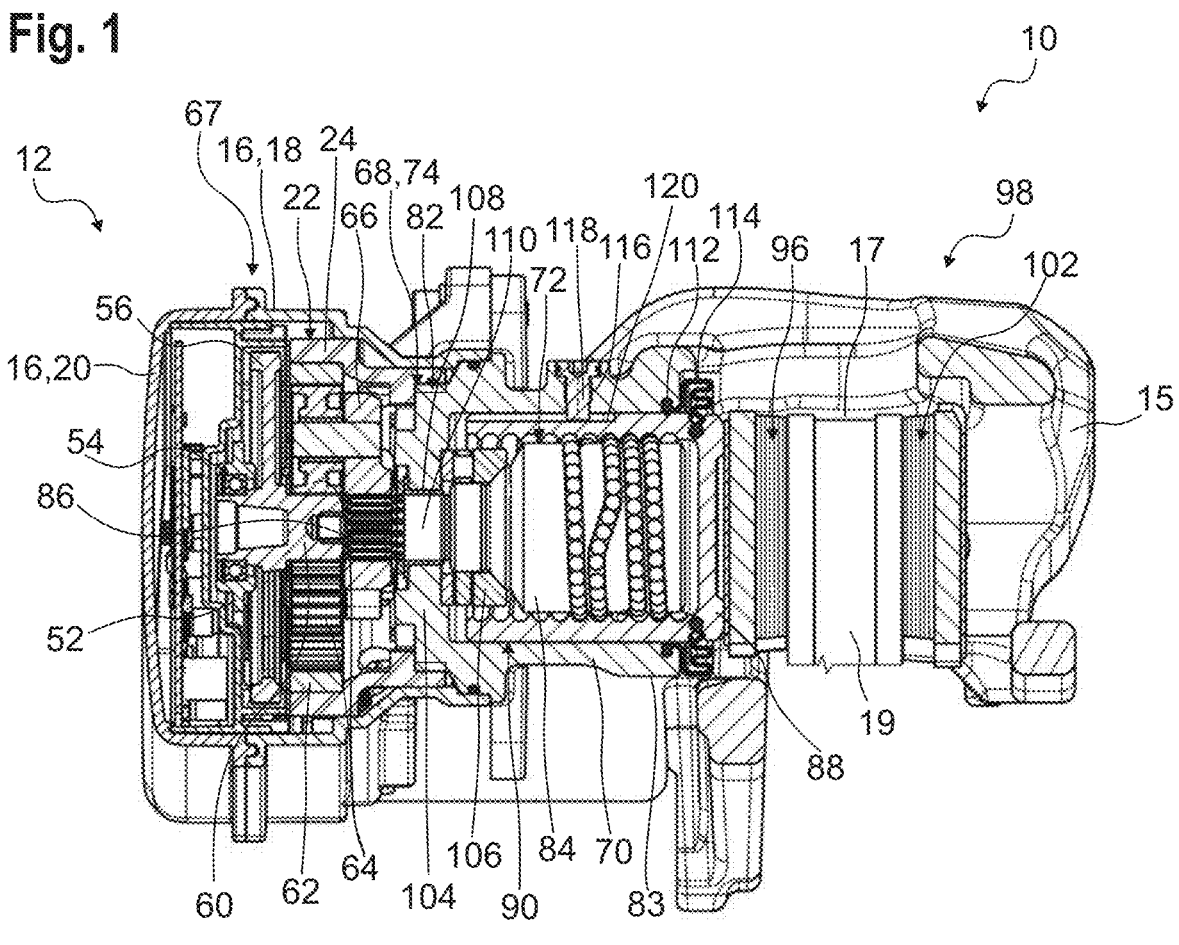
FIG. 1 shows a sectional illustration of an actuator assembly according to the disclosure.

FIG. 1 shows an actuator assembly 10 for a vehicle brake.

Figure 2:
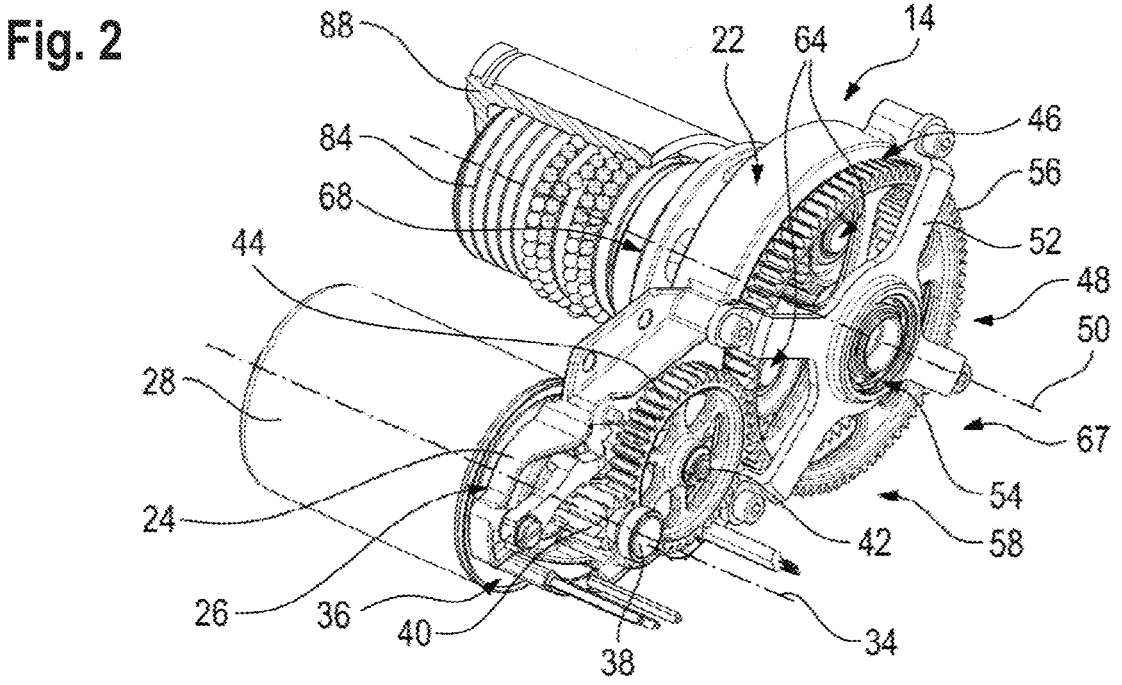
FIG. 2 shows a drive assembly for the actuator assembly according to the disclosure.

The actuator assembly 10 comprises a control assembly 12, mountable as a separate sub-unit, and a drive assembly 14, also mountable as a separate sub-unit (see FIG. 2).

The control assembly 12 and the drive assembly 14 are arranged in a common housing 16.

The housing 16 comprises a substantially sleeve-like housing base part 18 and a housing cover 20, which tightly closes the housing base part 18 in fitted state.

In the exemplary arrangement shown, the housing cover 20 is also substantially dish-shaped.

In one exemplary arrangement, both the housing base part 18 and the housing cover 20 are made of a plastic material. Thus the housing 16 as a whole is made of plastic material.

Furthermore, the actuator assembly 10 comprises a brake calliper 15 in which a space 17 for a brake disc 19 is formed. The end of the housing 16 closest to the brake disc 19 is pushed partially onto the brake calliper 15.

Figure 3:
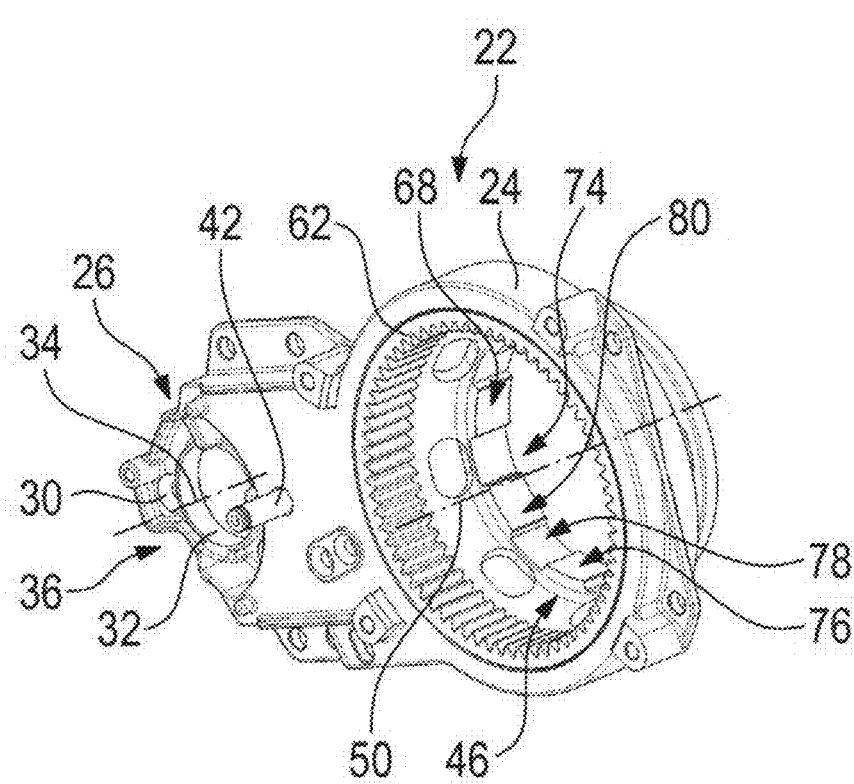
FIG. 3 shows a frame part of the actuator assembly according to the disclosure.

The drive assembly 14 comprises a carrier assembly 22 which has a plate-like frame part 24, as FIGS. 2 and 3 show clearly.

A first fixing interface 26 is provided on the plate-like frame part 24, at which, in the exemplary arrangement illustrated, an electric motor 28 is attached.

More precisely, the electric motor 28 is captively connected to the frame part 24 via the first fixing interface 26. For this, a bore 30 (see FIG. 3) is provided on the frame part 24, via which the electric motor 28 may be attached to the frame part 24 by a screw. The frame part 24 absorbs the forces of the electric motor 28 and retains this.

In addition, a centring device 32 (see FIG. 3 again) in the form of a centring face is arranged on the frame part 24. The electric motor 28 may thus be attached to the frame part 24 so as to be centred with respect to a centre axis 34 of the first fixing interface 26.

Also, a rotational locking device 36 is provided in the form of a rotational locking depression, which is configured to prevent the electric motor 28 from rotating relative to the frame part 24.

An output gear wheel 40 is arranged on an output shaft 38 of the electric motor 28 for the introduction of torque into the drive assembly 14.

In addition, a bearing journal 42 is provided on the frame part 24, on which, in the exemplary arrangement illustrated, a gear wheel 44 is mounted which meshes with the output gear wheel 40.

Also on the frame part 24, a receiving space 46 is provided for a planetary gear stage 48.

A centre axis 50 of the receiving space 46 is arranged substantially parallel to the centre axis 34 of the first fixing interface 26.

Furthermore, a reinforcement part 52 is attached to the frame part 24 such that it spans the receiving space 46 axially at the end relative to the centre axis 50.

In the exemplary arrangement shown, the reinforcing part 52 is substantially cruciform.

Also, a bearing point 54 is provided on the reinforcing part 52 for a gear wheel 56, which is arranged coaxially to the planetary gear stage 48.

The gear wheel 56 meshes with the gear wheel 44.

Accordingly, the gear wheel 44 and the gear wheel 56 form a wheel gear mechanism 58, for which the output gear wheel 40 acts as the input member.

Furthermore, the gear wheel 56 is formed integrally with a sun gear 60 (see FIG. 1) of the planetary gear stage 48. In this way, the wheel gear mechanism 58 and the planetary gear stage 48 are coupled together for drive purposes.

The planetary gear stage 48 also comprises a ring gear 62 which runs substantially around an inner circumference of the receiving space 46 (see FIG. 3).

For drive purposes, in the exemplary arrangement illustrated, a total of three planet gears 64 are provided between the sun gear 60 and the ring gear 62, as FIG. 2 shows particularly clearly. These planet gears are mounted rotatably on a planet carrier 66.

The planet carrier 66 forms an output element of the planetary gear stage 48.

The wheel gear mechanism 58 and the planetary gear stage 48 are jointly known as the gear unit 67.

The frame part 24 additionally comprises a second fixing interface 68, which is configured for fixing of the brake calliper 15 received therein. The fixing interface 68 can be seen in FIG. 3, which shows the frame part 24 in a perspective view.

A centre axis of the second fixing interface 68 is here congruent with the centre axis 50 of the receiving space 46 and for this reason carries the same reference sign.

The second fixing interface 68 has a rotational locking geometry 74 which runs circumferentially around the centre axis 50 and is formed by several radial protrusions 76 and radial depressions 78 arranged alternately around the circumference. The rotational locking geometry 74 is thus a splined shaft geometry. For reasons of greater clarity, in FIG. 3 only one exemplary radial protrusion 76 and one exemplary radial depression 78 carry a reference sign.

The radial protrusions 76 and the radial depressions 78 have a constant pitch. This means that the radial depressions 78 are each the same length in the circumferential direction. The radial protrusions 76 are also each the same length in the circumferential direction. In addition, a radial height of the radial protrusions 76 is constant.

In this way, a rotational locking device 80 of the second fixing interface 68 is formed.

A complementary rotational locking geometry 82, which also may have a splined shaft geometry, is provided at the end of the brake calliper 15 to be coupled to the second fixing interface 68.

The brake calliper 15 may accordingly slide along the centre axis 50 into the rotational locking geometry 74 of the second fixing interface 68 where it is held rotationally fixedly by form fit.

As FIG. 1 shows, the brake calliper 15 comprises, as well as the space 17 for the brake disc 19, a sleeve-like portion 70.

The rotational locking geometry 82 is formed on an outer wall 83 of the brake calliper 15 in the region of the sleeve-like portion 70.

The sleeve-like portion 70 is open towards the space 17.

A spindle drive 72 is received in the interior of the sleeve-like portion 70.

This comprises a spindle 84, in the present case configured as a recirculating ball spindle.

The spindle 84 is rotationally fixedly connected to the planet carrier 66 via a toothing portion 86 (see FIG. 1).

Thus the spindle drive 72 can be driven by the electric motor 28. In detail, the electric motor 28 is coupled to the spindle drive 72 for drive purposes via the wheel gear mechanism 58 and the planetary gear stage 48.

An actuating slide 88 is mounted on the spindle 84 and configured as a piston-like spindle nut. The actuating slide 88 is accordingly also received in the sleeve-like portion 70.

Rotation of the spindle 84 causes an axial displacement of the actuating slide 88 along the centre axis 50.

The actuating slide 88 is here guided along the centre axis 50 on a running face 90, wherein the running face 90 is formed on an inside of the sleeve-like portion 70. The running face 90 substantially corresponds to a cylinder casing surface forming the inner circumference of the sleeve-like portion 70.

The actuating slide 88 serves for applying a first brake pad 96 of a brake jaw assembly 98 to the brake disc 19. In other words, by the actuator assembly 10, the first brake pad 96 can be actively moved towards a brake disc 19, formed as a disc in the exemplary arrangement illustrated.

In detail, by the electric motor 28, the actuating slide 88 is transferred optionally, via the wheel gear mechanism 58, the planetary gear stage 48 and the spindle drive 72, into an extended position assigned to application of the first brake pad 96 on the brake disc 19.

Because of the reaction forces acting inside the actuator assembly 10 and the brake jaw assembly 98, a second brake pad 102 is thereby also applied to the brake disc 19.

It is clear that the actuating slide 88 can be moved in the same way, by operation of the electric motor 28, into a retracted position which is assigned to a lifting of the first brake pad 96 and the second brake pad 102 from the brake disc 19.

In the present case, the actuator assembly 10 is designed without self-inhibition so that, because of system-inherent elasticities, the actuating slide 88 also automatically moves back into the retracted position when no longer actively loaded into the extended position by the electric motor 28.

In order to absorb the resulting counter-forces from actuation of the brake jaw assembly 98, at an end facing away from the space 17, the sleeve-like portion 70 has a wall 104 which runs transversely to a movement direction of the actuating slide 88.

The spindle drive 72 rests axially on the wall 104, for example via a bearing 106.

An opening 108 is provided in the wall 104, through which a shaft 110 of the spindle drive 72 extends.

The toothing portion 86 is formed on the shaft 110.

The shaft 110 is coupled to the gear unit 67 outside the sleeve-like portion 70.

A recess 112 for a seal 114 may be provided on an inside of the brake calliper 15 at the transition from the space 17 to the sleeve-like portion 70.

This seal 114 is formed as a bellows and held not only on the brake calliper 15 but also on the actuating slide 88, so that the seal 114 is expanded or compressed when the actuating slide 88 moves.

Furthermore, an opening 116 is provided in the brake caliper 15 in the region of the sleeve-like portion 70. A rotational locking element 118 is inserted in the opening 116 and protrudes through the opening 116 to engage in an axially running groove 120 on the actuating slide 88.

In the exemplary arrangement shown, the rotational locking element 118 is a screw which is screwed into a threaded bore forming the opening 116.

The invention claimed is:

1. An actuator assembly for a vehicle brake, with comprising:
    a brake calliper in which a space is formed for a brake disc,
    an actuating slide for a brake pad, wherein the actuating slide can be moved optionally between a retracted position and an extended position, and
    wherein in the brake calliper, adjoining the space, a sleeve-like portion is formed with a running face for the actuating slide, wherein the actuating slide is received in the sleeve-like portion and is guided linearly on the running face,
    wherein the sleeve-like portion includes a rotational locking geometry on an outer wall for form-fit connection to a frame part of a carrier assembly.

2. The actuator assembly according to claim 1, wherein an opening is present in the brake calliper in a region of the sleeve-like portion, and a rotational locking element protrudes through the opening and engages in an axially running groove on the actuating slide.

3. The actuator assembly according to claim 2, on an end facing away from the space, the sleeve-like portion has a wall which runs transversely to a movement direction of the actuating slide, wherein a spindle drive rests axially on the wall.

4. The actuator assembly according to claim 3, wherein a recess for a seal is provided on an inside of the brake calliper at a transition from the space to the sleeve-like portion.

5. The actuator assembly according to claim 1, wherein on an end facing away from the space, the sleeve-like portion has a wall which runs transversely to a movement direction of the actuating slide, wherein a spindle drive rests axially on the wall.

6. The actuator assembly according to claim 5 wherein an opening is present in the wall, wherein a shaft of the spindle drive extends through the opening and the shaft is coupled to the gear unit outside the sleeve-like portion.

7. The actuator assembly according to claim 6, wherein a rotational locking geometry is formed on an outer wall of the brake calliper in a region of the sleeve-like portion for a form-fit connection of the brake calliper to a frame part of a carrier assembly.

8. The actuator assembly according to claim 1, 
    wherein the actuator assembly comprises an electric motor which is coupled for drive purposes to the actuating slide via a gear unit and a spindle drive, in order to move the actuating slide between the retracted position and the extended position.

9. The actuator assembly according to claim 8 wherein an opening is present in the wall, wherein a shaft of the spindle drive extends through the opening and the shaft is coupled to the gear unit outside the sleeve-like portion.

10. The actuator assembly according to claim 1, wherein the sleeve-like portion is open towards the space.

11. The actuator assembly according to claim 10, wherein an opening is present in the brake calliper in a region of the sleeve-like portion, and a rotational locking element protrudes through the opening and engages in an axially running groove on the actuating slide.

12. The actuator assembly according to claim 1, wherein the rotational locking geometry is a splined shaft geometry.

13. The actuator assembly according to claim 1, wherein a recess for a seal is provided on an inside of the brake calliper at a transition from the space to the sleeve-like portion.

* * * * *